(12) United States Patent
Park et al.

(10) Patent No.: US 8,308,220 B2
(45) Date of Patent: Nov. 13, 2012

(54) SLIDING GUIDE RAIL FOR CONVERTIBLE VEHICLE

(75) Inventors: Tae Wan Park, Seoul (KR); Chang Wook Park, Suwon-si (KR); Seung Jin Heo, Seoul (KR); Jay Il Jeong, Seoul (KR); Jong Hoon Lee, Seoul (KR); In Sik Hwang, Seoul (KR)

(73) Assignees: Hyundai Motor Company, Seoul (KR); Kookmin University Industry-Academy Cooperation Foundation, Seoul (KR)

( * ) Notice: Subject to any disclaimer, the term of this patent is extended or adjusted under 35 U.S.C. 154(b) by 271 days.

(21) Appl. No.: 12/622,293

(22) Filed: Nov. 19, 2009

(65) Prior Publication Data

US 2011/0049928 A1 Mar. 3, 2011

(30) Foreign Application Priority Data

Aug. 27, 2009 (KR) .................. 10-2009-0080007

(51) Int. Cl.
*B60J 7/02* (2006.01)
*B60J 7/04* (2006.01)

(52) U.S. Cl. ........... 296/107.19; 296/107.2; 296/107.08; 296/108; 296/210

(58) Field of Classification Search ............ 296/107.19, 296/107.17, 107.18, 107.2, 108, 107.09, 296/107.11, 107.13, 107.15, 218, 219
See application file for complete search history.

(56) References Cited

U.S. PATENT DOCUMENTS

| 2,785,922 | A   | * | 3/1957  | Chika ........................ 296/107.2 |
| 6,412,860 | B1  | * | 7/2002  | Reinsch ........................ 296/219 |
| 2002/0005657 | A1 | * | 1/2002 | Farber ............................ 296/219 |
| 2003/0038502 | A1 | * | 2/2003 | Marold et al. ........... 296/107.18 |
| 2005/0140164 | A1 | * | 6/2005 | Wilms et al. ............. 296/107.18 |
| 2006/0267371 | A1 | * | 11/2006 | Queveau et al. ......... 296/107.18 |
| 2007/0210610 | A1 | * | 9/2007 | Bunsmann et al. ...... 296/107.18 |
| 2009/0045655 | A1 |   | 2/2009 | Willard et al. |
| 2009/0273209 | A1 | * | 11/2009 | Joab .............................. 296/215 |

FOREIGN PATENT DOCUMENTS

| JP | 9-109689 A | 4/1997 |
| JP | 2002-103977 A | 4/2002 |
| JP | 2007-22219 A | 2/2007 |
| KR | 96-21679 A | 12/1994 |
| KR | 2002-0048075 A | 6/2002 |

* cited by examiner

*Primary Examiner* — Glenn Dayoan
*Assistant Examiner* — Sunsurraye Westbrook
(74) *Attorney, Agent, or Firm* — Morgan, Lewis & Bockius LLP (57) ABSTRACT

A sliding guide rail for a convertible vehicle may include a front rail, a middle rail into which the front rail slides to enter, a rear rail into which the middle rail slides to enter, a wire screw for supplying the sliding power to the front rail, a rolling member for facilitating the sliding movement, and locking means for locking the front rail to the middle rail and the middle rail to the rear rail, thus providing a sliding mechanism by a single driving device.

5 Claims, 8 Drawing Sheets

SLIDING GUIDE RAIL FOR CONVERTIBLE VEHICLE

CROSS-REFERENCE TO RELATED APPLICATION

The present application claims priority of Korean Patent Application Number 10-2009-0080007 filed Aug. 27, 2009, the entire contents of which application is incorporated herein for all purposes by this reference.

BACKGROUND OF THE INVENTION

1. Field of the Invention

The present disclosure relates to a sliding guide rail for a convertible vehicle. More particularly, it relates to a guide rail for a sliding mechanism of a convertible vehicle.

2. Description of Related Art

In general, a convertible vehicle is provided with a movable roof capable of being opened and closed with respect to a vehicle body. When the vehicle roof is opened, the roof is stored in a trunk in a folding or sliding manner to be used as an open car, and the opened roof can be closed over the vehicle body, if necessary.

Figure 6:
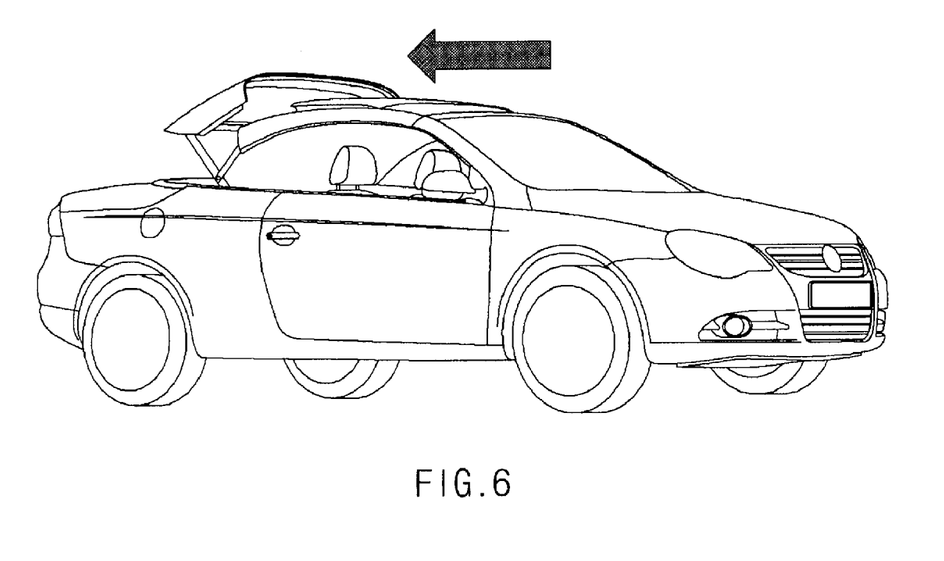
FIGS. 6 and 7 are images showing conventional convertible vehicles.
Figure 7:
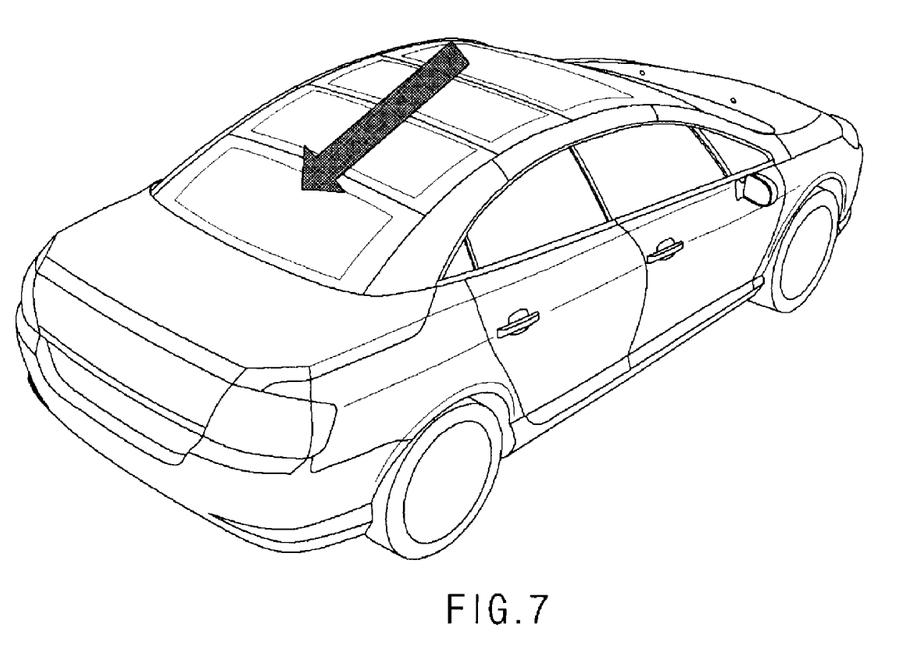

FIGS. 6 and 7 are images showing conventional convertible vehicles.

The convention convertible vehicles using a sliding mechanism include Volkswagen Eos with a slidable sunroof (refer to FIG. 6) and Peugeot 407 Macarena with a panorama sunroof (refer to FIG. 7).

In the case of Volkswagen Eos, when a wire screw pulls the sunroof backward, the sunroof slides along a guide rail on a front side and, in the case of Macarena, the sunroof slides along a rail formed on a side pillar in the form of a panorama.

However, the guide rail applied to the conventional convertible vehicle such as Volkswagen Eos has a two-step rail structure in which only the sunroof slides. Accordingly, a four-bar link mechanism is used in a rear roof, which increases the height of a roof module packaged, instead of the guide rail, thus reducing the volume of the trunk and increasing the time required to open and close the vehicle roof.

Moreover, in the case of the convertible vehicle such as Macarena, since the sunroof is driven in the form of a panorama along a single guide rail, the side pillars protrude toward a rear seat of the vehicle when the sunroof is stored in the trunk, thus reducing the rear space of the vehicle.

Furthermore, an additional driving device for opening the side pillars to both sides is required to ensure the space of the rear seat.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to solve the above-described problems associated with prior art. Accordingly, the present invention provides a sliding guide rail for a convertible vehicle including a front rail, a middle rail into which the front rail slides to enter, a rear rail into which the middle rail slides to enter, a wire screw for supplying the sliding power to the front rail, a rolling member for facilitating the sliding movement, and locking means for locking the front rail to the middle rail and the middle rail to the rear rail, thus providing a sliding mechanism by a single driving device.

In one aspect, the present invention provides a sliding guide rail for a convertible vehicle, the sliding guide rail including: a wire screw; a front rail to which the wire screw is connected and fixed; a middle rail into which the front rail slides to enter; a rear rail into which the middle rail slides to enter; a middle locking means for connecting and disconnecting the front rail to and from the middle rail; and a rear locking means for connecting and disconnecting the middle rail to and from the rear rail.

Other aspects and other embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
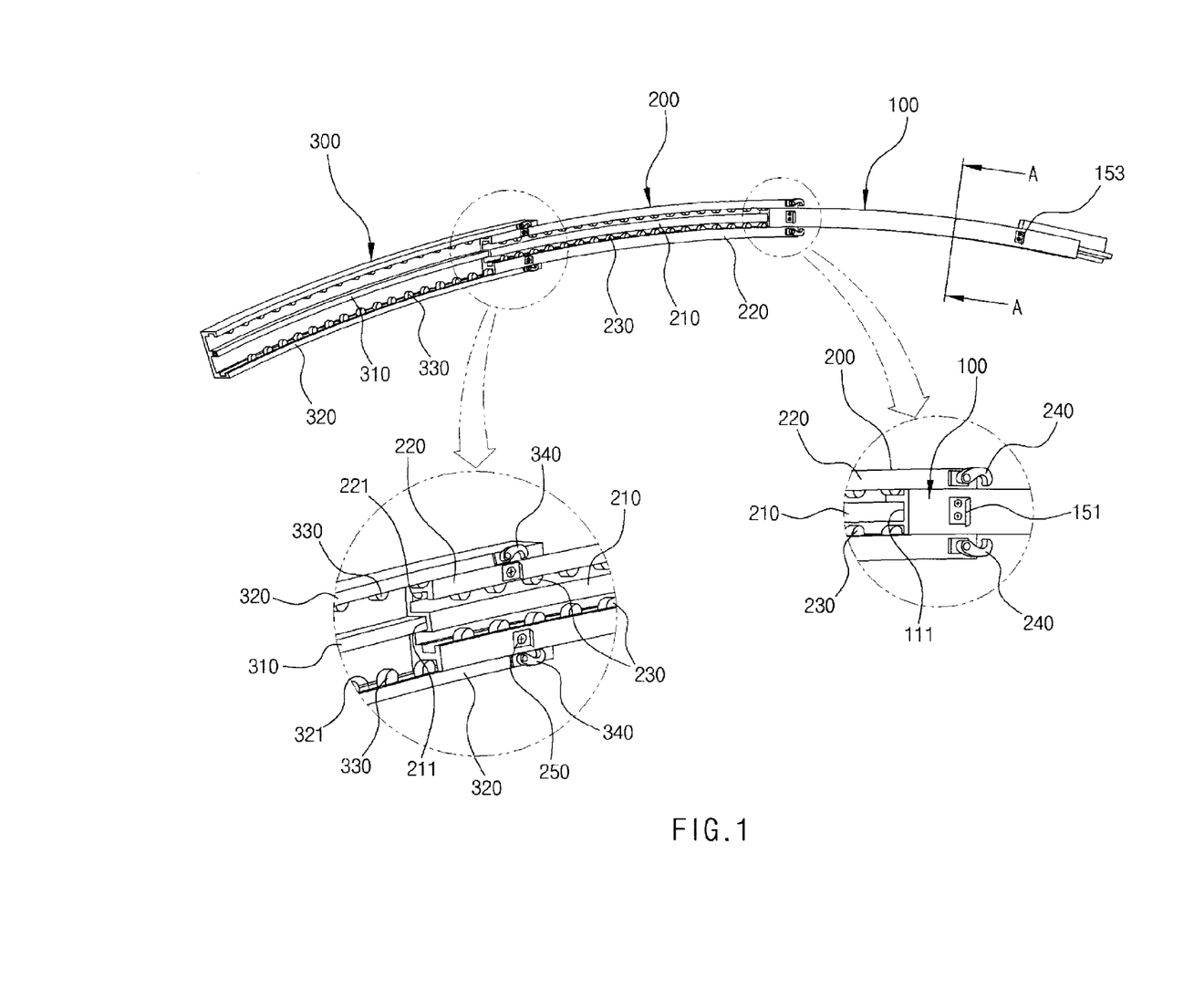
FIG. 1 is a perspective view showing a sliding guide rail for a convertible vehicle in accordance with various embodiments embodiment of the present invention.
Figure 2:
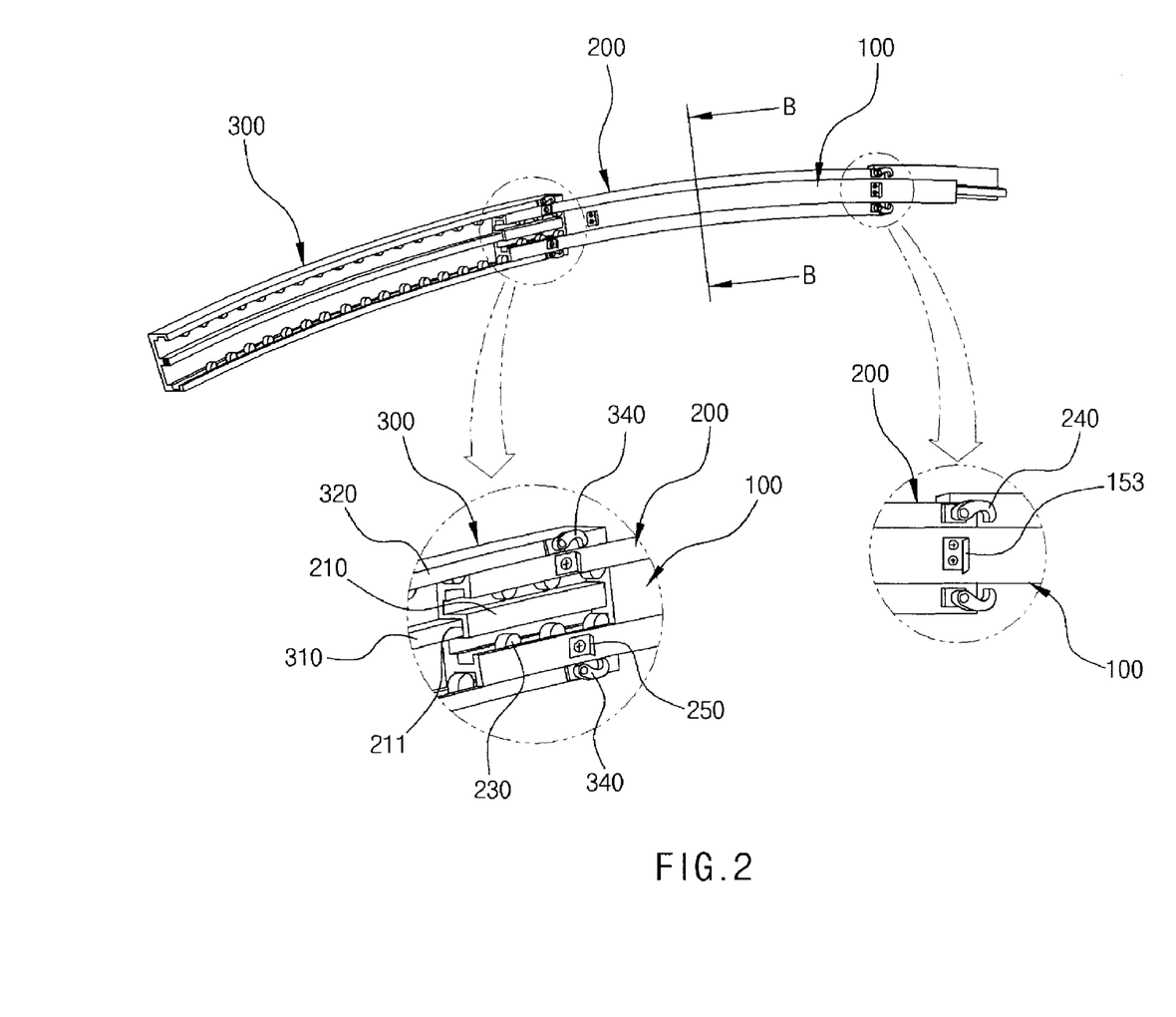
FIG. 2 is a perspective view showing a state where a front rail enters the inside of a middle rail in the guide rail of FIG. 1.
Figure 3:
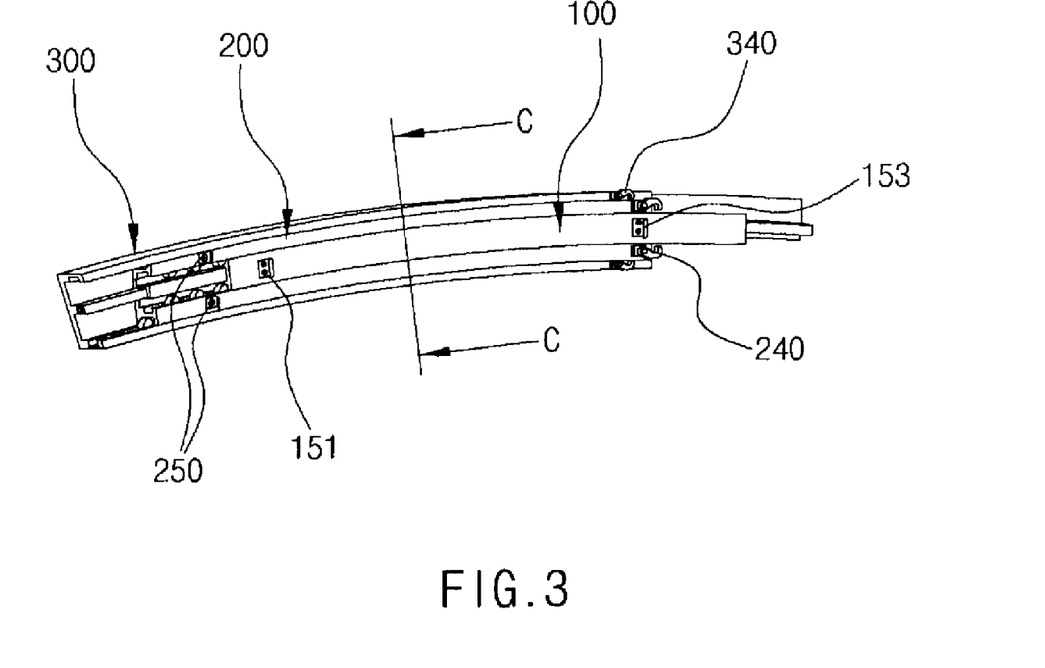
FIG. 3 is a perspective view showing a state where the middle rail enters the inside of a rear rail in the guide rail of FIG. 1.
Figure 4:
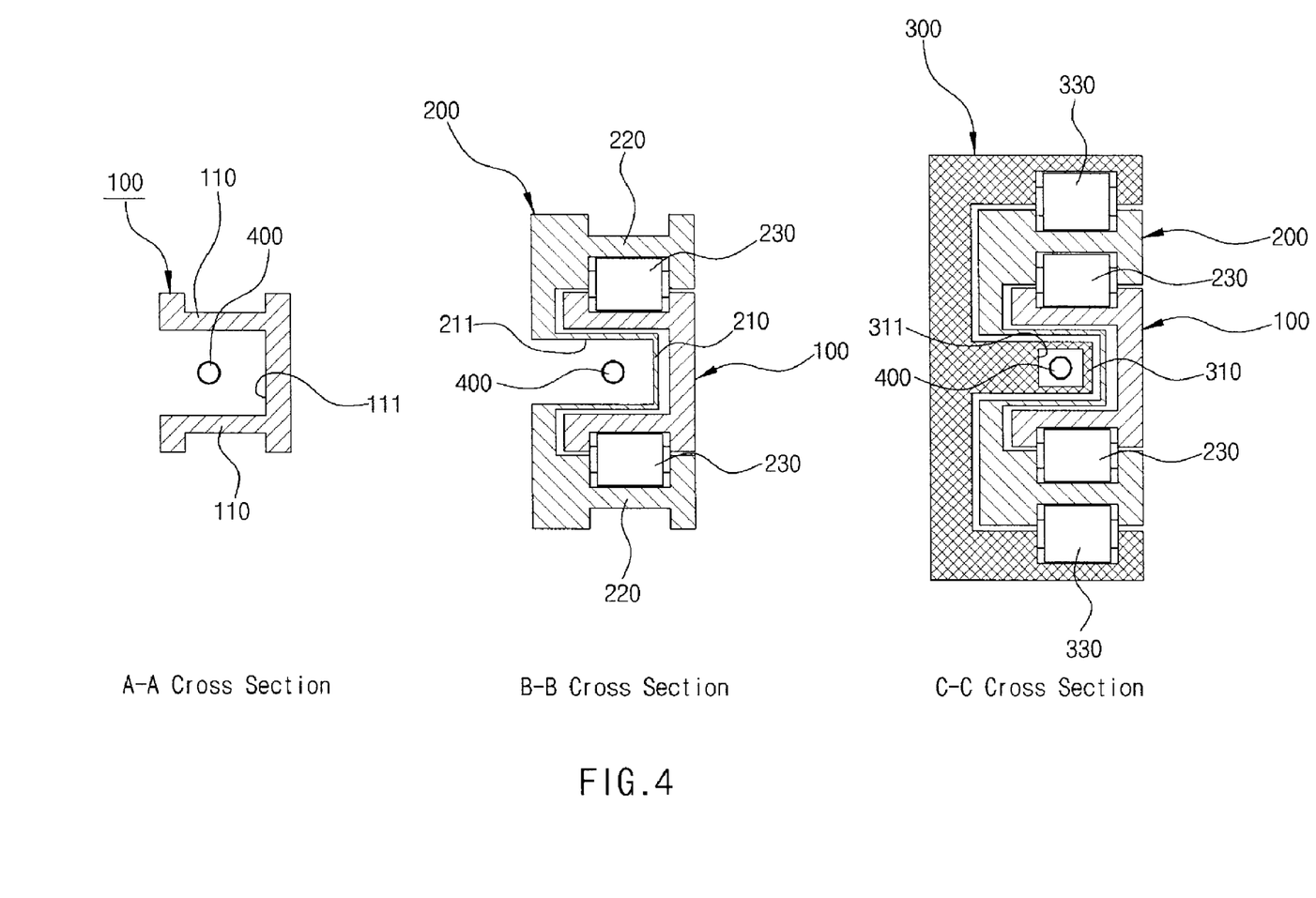
FIG. 4 is a schematic cross-sectional view showing the internal section of FIGS. 1 to 3.

FIG. 1 is a perspective view showing a sliding guide rail for a convertible vehicle in accordance with various embodiments of the present invention, which is completely opened. FIG. 2 is a perspective view showing a state where a front rail enters the inside of a middle rail in the guide rail of FIG. 1, FIG. 3 is a perspective view showing a state where the middle rail enters the inside of a rear rail in the guide rail of FIG. 1, and FIG. 4 is a schematic cross-sectional view showing the internal section of FIGS. 1 to 3.

As shown in the figures, the sliding guide rail in accordance with the present invention may include a wire screw 400 operated by a driving device (not shown) such as a main motor, a front rail 100 to which a front end of the wire screw 400 is connected and fixed, a middle rail 200 into which the front rail 100 slidably enters, and a rear rail 300 into which the middle rail 200 slidably enters.

In the guide rail in accordance with the present invention, the wire screw 400 is connected to the driving device for supplying the sliding power to be pulled by the operation of the driving device.

The wire screw 400 is inserted and mounted in a front groove 111 formed in the longitudinal direction of the front rail 100 and crosses a center portion 210 of the middle rail 200 ("middle center portion") and a center portion 310 of the rear rail 300 ("rear center portion") such that its front end is bound on one side of the front rail 100 to transmit the sliding power.

For the sliding movement of the guide rail in accordance with the present invention, the front rail 100 includes the front groove 111 provided between side portions 110 of the front rail ("front side portion") having a substantial 'ᴄ' shape to have a cross-section of 'Π'. The middle center portion 210 (having a 'ᴄ' shape, for example) that enters the front groove 111 of the front rail 100 is provided in the middle rail 200, and the rear center portion 310 that enters a middle groove 211 of the middle center portion 210 is provided in the rear rail 300.

A through-hole 311 through which the wire screw 400 passes is provided in the rear center portion 310.

In the present invention, the middle center portion 210 and the rear center portion 310 serve to guide the sliding movement of the front rail 100 and the middle rail 200.

The front rail 100 and the middle rail 200, which receives the power from the wire screw 400, slide to enter the inside of the rear rail 300.

The guide rail in accordance with the present invention includes a middle locking means, which connects or disconnects the front rail 100 to or from the middle rail 200, and a rear locking means, which connects or disconnects the middle rail 200 to or from the rear rail 300. Accordingly, the front rail 100 slides to enter the inside of the middle rail 200, and then the middle rail 200 slides to enter the inside of the rear rail 300.

The middle locking means may include a middle latch 240, installed at the front end of the middle rail 200, and first and second locked members 151 and 153, installed at the front and rear ends of the front rail 100, respectively, such that the middle latch 240 is sequentially connected to the first and second locked members 151 and 153. The rear locking means may include a rear latch 340 installed at the front end of the rear rail 300 and a middle locked member 250 installed at the rear end of the middle rail 200 such that the rear latch 340 is fixedly connected to the middle locked member 250.

In the state where the guide rail of the present invention is fully opened as shown in FIG. 1, the middle latch 240 is connected to the first locked member 151, and the rear latch 340 is connected to the middle locked member 250 to fix the connection between the front, middle, and rear rails 100, 200, and 300 and prevent the front and middle rails 100 and 200 from freely sliding.

The sliding movement between the front, middle, and rear rails 100, 200, and 300 is locked and unlocked by the operation of the middle and rear locking means. As the sliding power is supplied via the wire screw 400, the front and middle rails 100 and 200 sequentially slide to enter the inside of the rear rail 300 as shown in FIG. 3.

In various embodiments of the present invention, the middle and rear latches 240 and 340 are configured to have a hook shape to be rotatably operated, and the locked members 151, 153, and 250 are configured to have a hole or ring shape such that the hook-shaped latches 240 and 340 are hooked and fixed, thus being locked and unlocked.

Moreover, a middle rolling member 230 and a rear rolling member 340 capable of freely rotating are provided between a side portion 220 of the middle rail 200 ("middle side portion") and a side portion 320 of the rear rail 300 ("rear side portion") to reduce the friction between the middle rail 200 and the rear rail 300 during the sliding movement of the front rail 100 and the middle rail 200 and to facilitate the sliding movement.

For example, as shown in FIG. 4, the middle side portion 220 is configured to have an 'I' shape and a rotatable middle rail roller 230 is provided inside the middle side portion 220 such that, when the front rail 100 slides to enter the inside of the middle rail 200, the middle rail roller 230 enters the front side portion 110 and the outer side of the front side portion 110 comes in contact with the middle rail roller 230.

Moreover, the rear side portion 320 is configured to have a substantial E' shape and a rotatable rear rail roller 330 is provided inside the rear side portion 320 such that, when the middle rail 200 slides to enter the inside of the rear rail 300, the rear rail roller 330 enters the middle side portion 220 and the outer side of the middle side portion 220 comes in contact with the rear rail roller 330.

At this time, the front, middle, and rear rails 100, 200, and 300 come in contact only with the middle and rear rolling members 230 and 330 and the other portions are spaced, thus facilitating the sliding movement in accordance with the present invention.

The sliding guide rail in accordance with the present invention having the above-described configuration provides a sliding mechanism, in which the front and middle rails 100 and 200 sequentially slide to enter the rear rail 300, and thus can be used as a mechanism for opening and closing a vehicle roof for a convertible vehicle.

Therefore, it is possible to increase the trunk volume and reduce the time required to open and close the vehicle roof with the use of the sliding mechanism of the convertible vehicle. Moreover, it is possible to simplify the roof mechanism of the convertible vehicle.

Furthermore, since the guide rail of the present invention slidably moves the respective rails 100, 200, and 300 using the wire screw 400 and the middle and rear locking means that fix the rails 100, 200, and 300, it is possible to provide the sliding movement via a single driving device capable of pulling the wire screw 400.

Next, the operation state of the sliding guide in accordance with various embodiments of the present invention will be described.

Figure 5A:
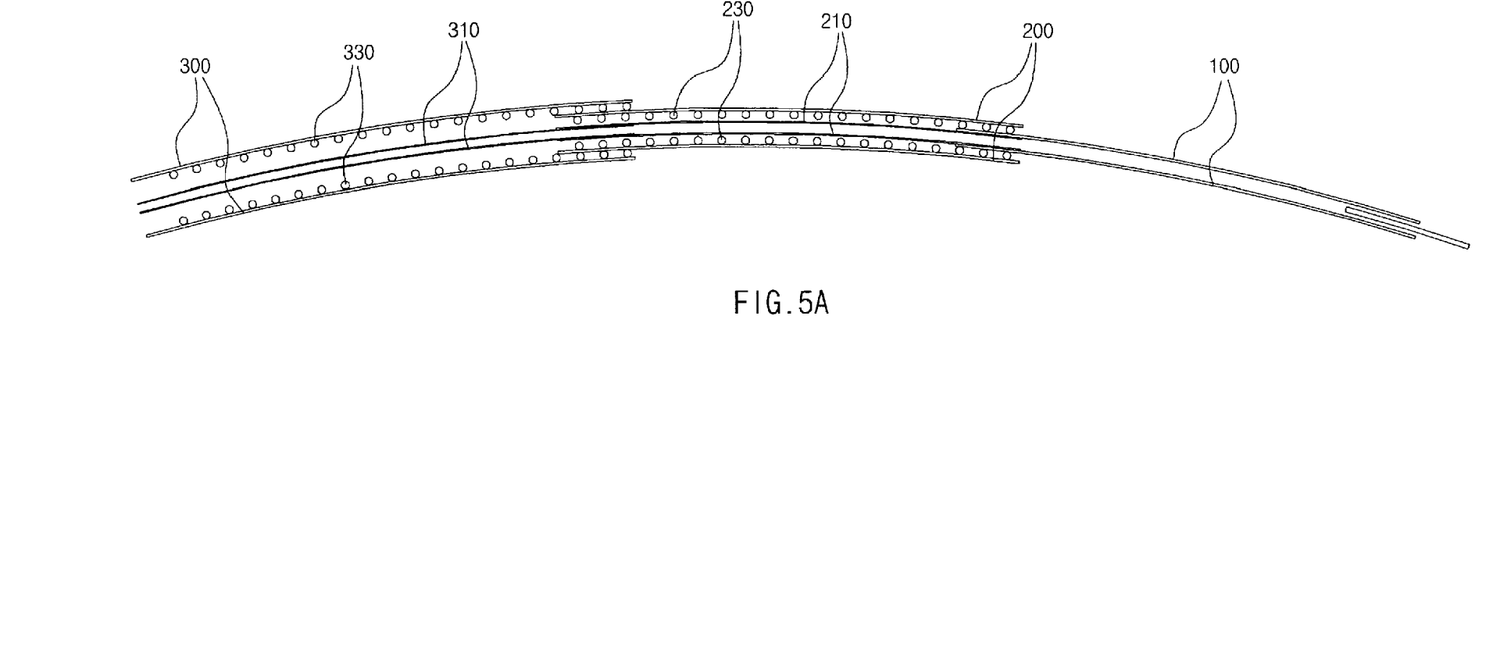
FIGS. 5A and 5B are schematic diagrams showing states where the guide rail in accordance with the present invention is completely opened and closed, respectively.
Figure 5B:
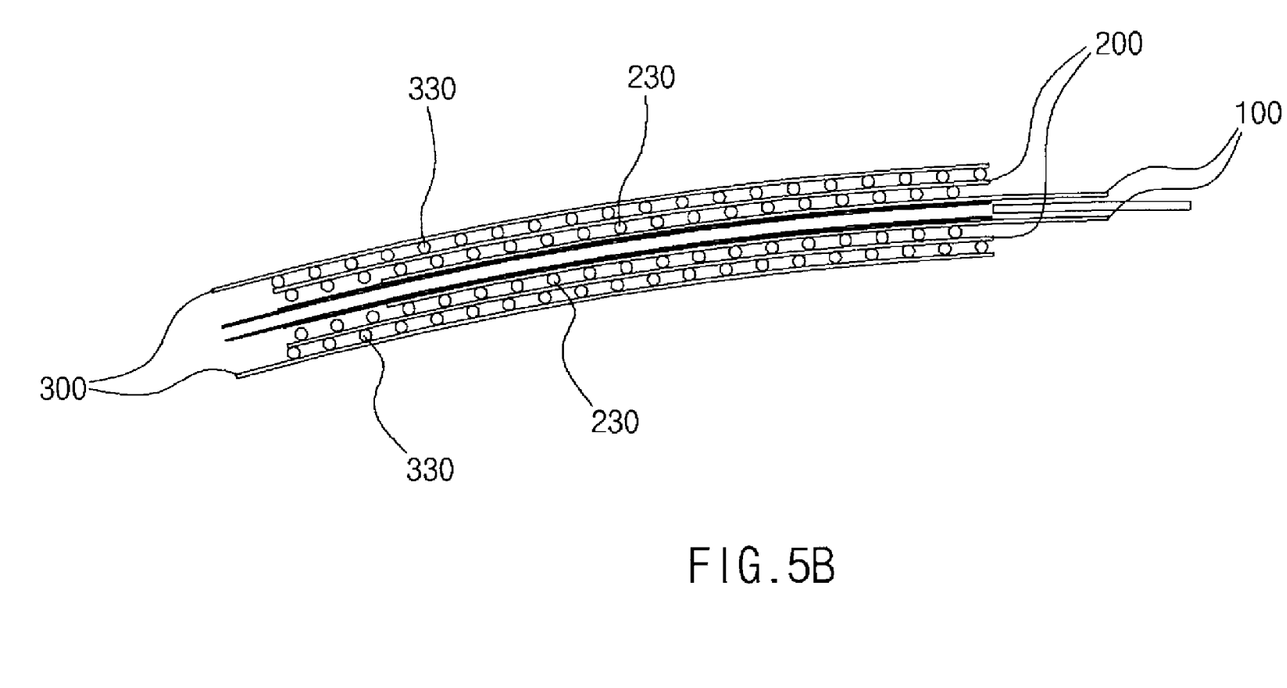

FIGS. 5A and 5B are schematic diagrams showing states where the guide rail in accordance with the present invention is completely opened and closed, respectively.

As shown in FIGS. 1 to 3, in the guide rail of the present invention, when the middle latch 240 is disconnected from the first locked member 151 and the wire screw 400 is pulled backward (toward the rear rail 300) by the main motor, the front rail 100 slides along the center portion 210 of the middle rail 200 to enter the inside of the side portion 220 of the middle rail 200.

When the sliding movement of the front rail 100 is completed, as shown in FIG. 2, the middle latch 240 locks the second locked member 153 such that the front rail 100 entering the inside of the middle rail 200 is fixed. Then, the rear latch 340 releases the connection with the middle locked member 250 such that the middle rail 200 can slide.

Subsequently, when the wire screw 400 is further pulled backward by the main motor, the middle rail 200 slides along the center portion 310 of the rear rail 300 and enters between the side portions 320 of the rear rail 300.

Meanwhile, the folded guide rail as shown in FIG. 3 can be opened as shown in FIG. 1 by pulling the wire screw 400 forward, and thus the vehicle roof for the convertible vehicle can be closed by the operation of the guide rail.

As described above, according to the sliding guide rail for the convertible vehicle of the present invention, the wire screw, the rolling member, and the locking means are mounted on the front, middle, and rear rails such that the front rail slides to enter the middle rail and the middle rail slides to enter the rear rail, thus providing the sliding mechanism.

Moreover, since the sliding guide rail in accordance with the present invention includes the wire screw for supplying the sliding power by the single driving device, it is possible to reduce the number of driving devices.

Furthermore, the present invention can be applied to a convertible vehicle to provide the sliding mechanism to the vehicle roof.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding guide rail for a convertible vehicle, the sliding guide rail comprising:
    a front rail including a front groove provided between front side portions inside the front rail;
    a middle rail into which the front rail slides wherein the middle rail includes:
        middle side portions to slide along outer surfaces of the front side portions;
        a middle center portion which enters the front groove of the front rail when the front rail slides into the middle rail; and
        middle grooves formed between the middle center portion and the middle side portions; and
    a rear rail into which the middle rail slides wherein the rear rail includes:
        rear side portions to slide along outer surfaces of the middle side portions; and
        a rear center portion which enters the middle groove and the middle center portion when the middle rail slides into the rear rail;
    a wire screw being connected and fixed to the front rail and inserted in the front groove of the front rail;
    a middle locking means for connecting and disconnecting the front rail to and from the middle rail; and
    a rear locking means for connecting and disconnecting the middle rail to and from the rear rail.

2. The sliding guide rail of claim 1, wherein the middle locking means comprises a middle latch installed at a front end of the middle rail, and first and second locked members installed at front and rear ends of the front rail, respectively, such that the middle latch is connected or disconnected to or from the first and second locked members.

3. The sliding guide rail of claim 1, wherein the rear locking means comprises a rear latch installed at a front end of the rear rail and a middle locked member installed at a rear end of the middle rail such that the rear latch is connected or disconnected to or from the middle locked member.

4. The sliding guide rail of claim 1, further comprising:
    a pair of middle rolling members mounted inside the middle side portions and entering the front side portions when the front rail slides into the middle rail; and
    a pair of rear rolling members mounted inside the rear side portions and entering the middle side portions when the middle rail slides into the rear rail.

5. The sliding guide rail of claim 1, wherein the wire screw is connected and fixed to the front rail and inserted in the front groove of the front rail, the middle groove of the middle rail, and a through hole of the rear center portion in the rear rail.

* * * * *